US010689207B1

(12) United States Patent
Ericson et al.

(10) Patent No.: US 10,689,207 B1
(45) Date of Patent: Jun. 23, 2020

(54) COMPACT COLLATOR, SYSTEM AND METHOD OF USE

(71) Applicant: Delkor Systems, Inc., St. Paul, MN (US)

(72) Inventors: Jeremiah J. Ericson, Andover, MN (US); Nicholas E. Kaiser, St. Francis, MN (US); Nicholas A. Orfei, North St. Paul, MN (US)

(73) Assignee: Delkor Systems, Inc., St. Paul, MN (US)

( * ) Notice: Subject to any disclaimer, the term of this patent is extended or adjusted under 35 U.S.C. 154(b) by 0 days.

(21) Appl. No.: 16/366,342

(22) Filed: Mar. 27, 2019

(51) Int. Cl.
*B65G 47/46* (2006.01)
*B65G 47/08* (2006.01)

(52) U.S. Cl.
CPC .......... *B65G 47/46* (2013.01); *B65G 47/082* (2013.01); *B65G 2201/0235* (2013.01); *B65G 2203/042* (2013.01)

(58) Field of Classification Search
CPC .... B65G 47/08; B65G 47/082; B65G 47/295; B65G 47/8823; B65G 47/46; B65G 2203/042; B65G 2201/0235
USPC ................ 198/426, 429, 419.1, 418.5, 460.1
See application file for complete search history.

(56) References Cited

U.S. PATENT DOCUMENTS

| | | | | |
|---|---|---|---|---|
| 1,654,706 A * | 1/1928 | Schoen | ................... | B65B 35/40 53/495 |
| 2,556,082 A * | 6/1951 | Hartness | ................ | B65B 21/04 53/495 |
| 2,771,177 A * | 11/1956 | Cutter | .................. | B65G 47/082 198/419.1 |
| 3,987,889 A * | 10/1976 | Godoy | ................... | B65G 47/82 198/429 |
| 4,029,198 A * | 6/1977 | Lingl, Jr. | ............... | B65G 47/32 198/419.1 |
| 4,038,909 A * | 8/1977 | Preisig | ................... | B65H 33/02 198/418.8 |
| 4,343,390 A * | 8/1982 | Laub, III | ............... | B65B 21/06 198/429 |
| 6,164,045 A * | 12/2000 | Focke | ..................... | B65B 5/105 198/429 |
| 6,296,103 B1 * | 10/2001 | Gross | ................... | B26D 7/0675 198/429 |
| 7,306,087 B1 * | 12/2007 | Hamsten | .............. | B65G 47/682 198/369.5 |
| 2003/0057058 A1 * | 3/2003 | Iwasa | ...................... | B65B 5/064 198/419.3 |

(Continued)

*Primary Examiner* — James R Bidwell
(74) *Attorney, Agent, or Firm* — Tysver Beck Evans

(57) ABSTRACT

A compact collator for collating and preparing product containers for packaging and its method of operation and use is provided herein. The collator includes a laner having a conveyor and defining an infeed area. Infeed sensors detect the passage of containers in and out of the infeed area. A gate retains containers in the infeed area until a set number of product containers (a slug) is detected. A slug of containers passing out of the infeed area is conveyed to a cross-pusher, which has an arm. The arm is actuated between a position adjacent to the conveyor to a position across the conveyer and over a pattern conveyor. When the slug is in a centered position relative to the arm, the arm pushes the containers 90 degrees from the laner's conveyor and onto the patterning conveyor.

9 Claims, 16 Drawing Sheets

(56) References Cited

U.S. PATENT DOCUMENTS

2014/0061000 A1* 3/2014 Ford .................. B65G 47/8823
              198/419.1

\* cited by examiner

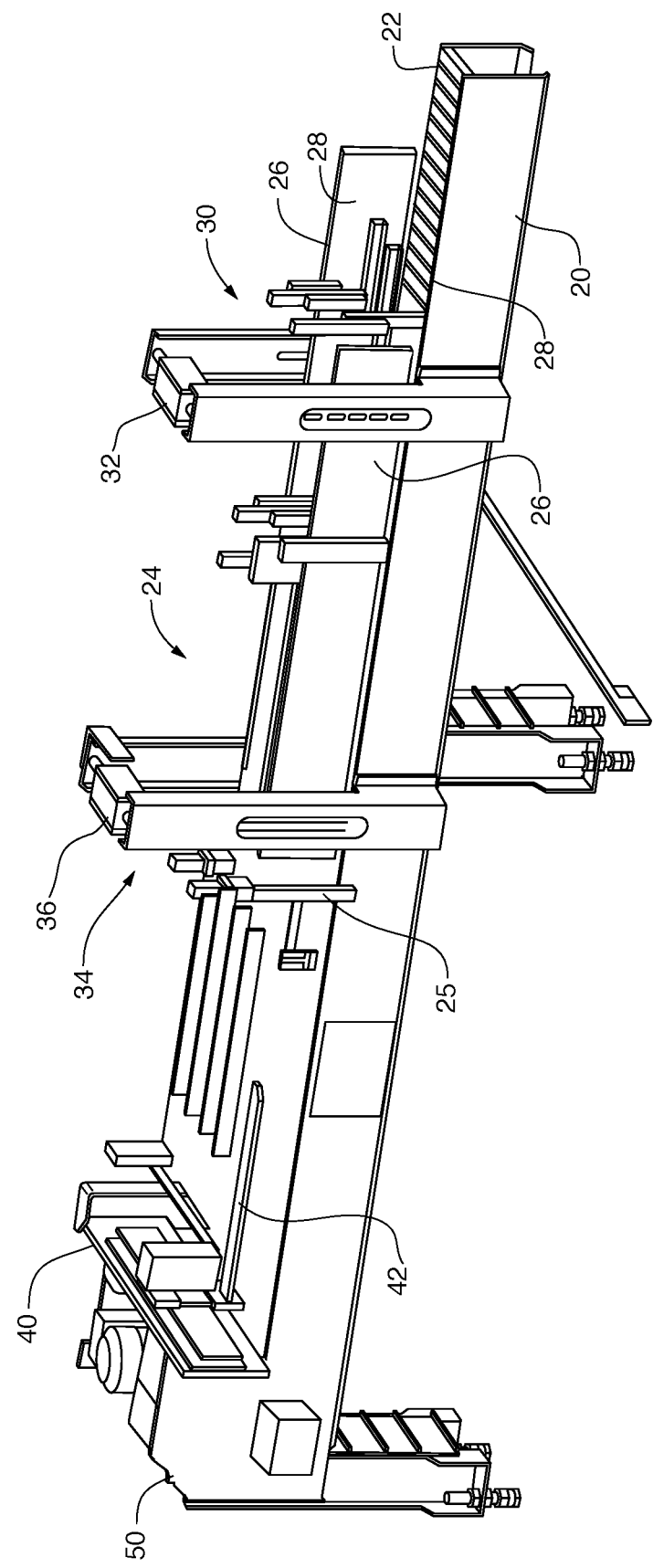

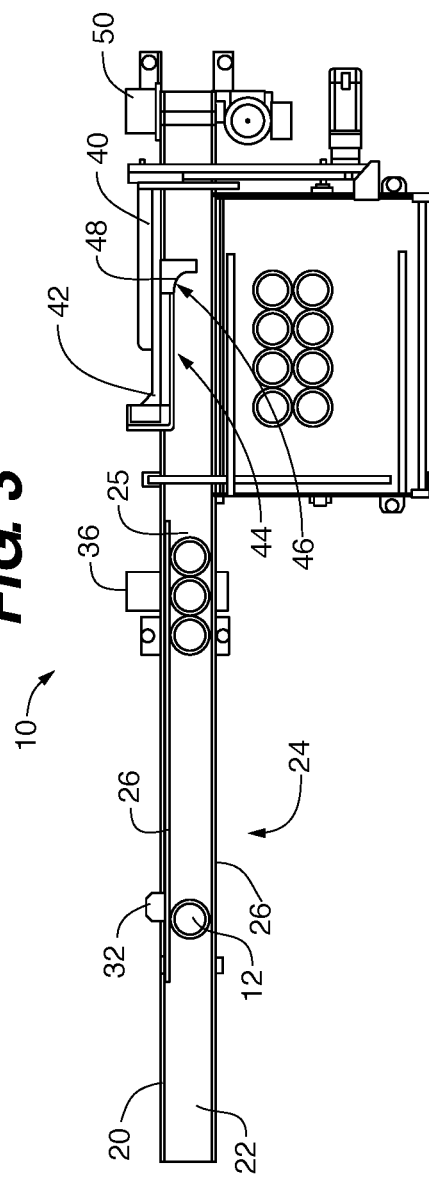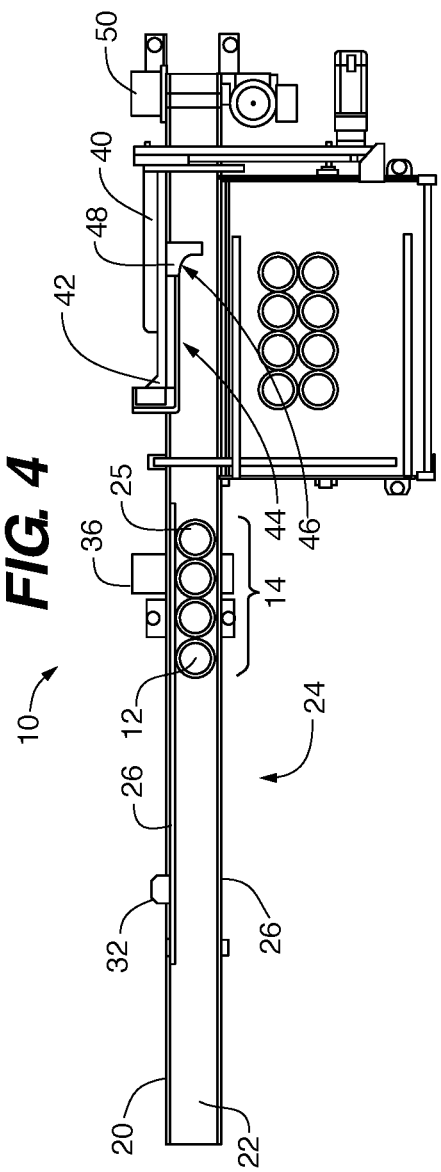

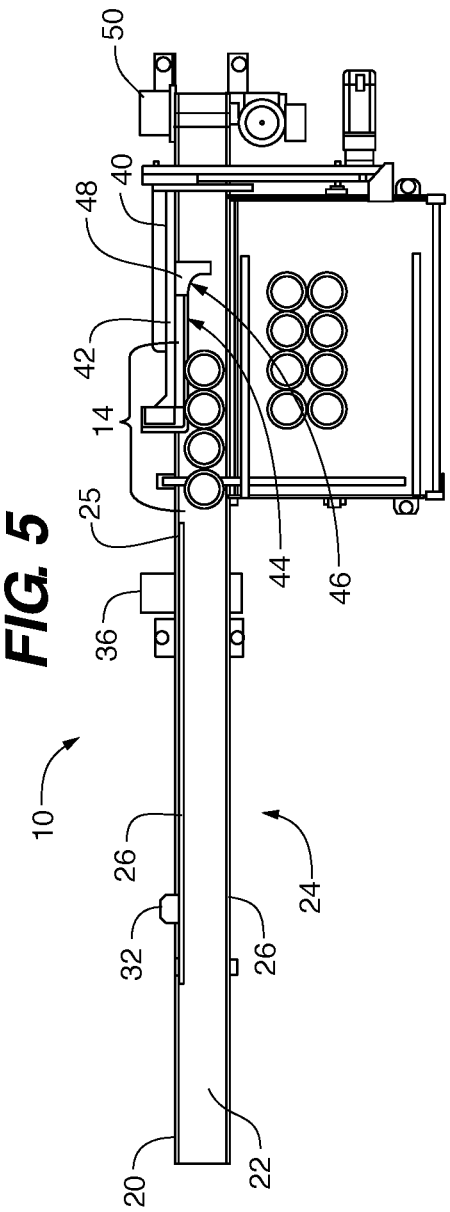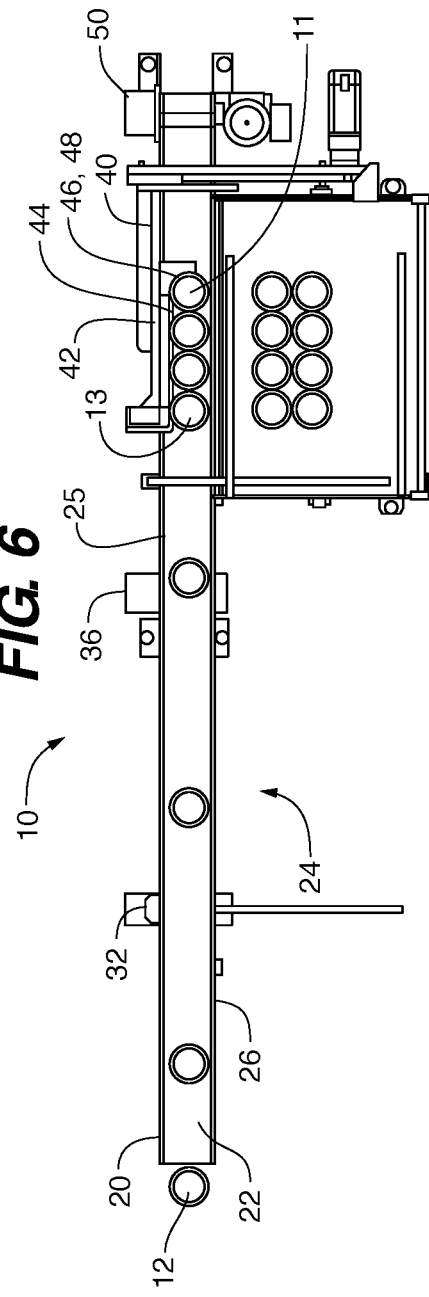

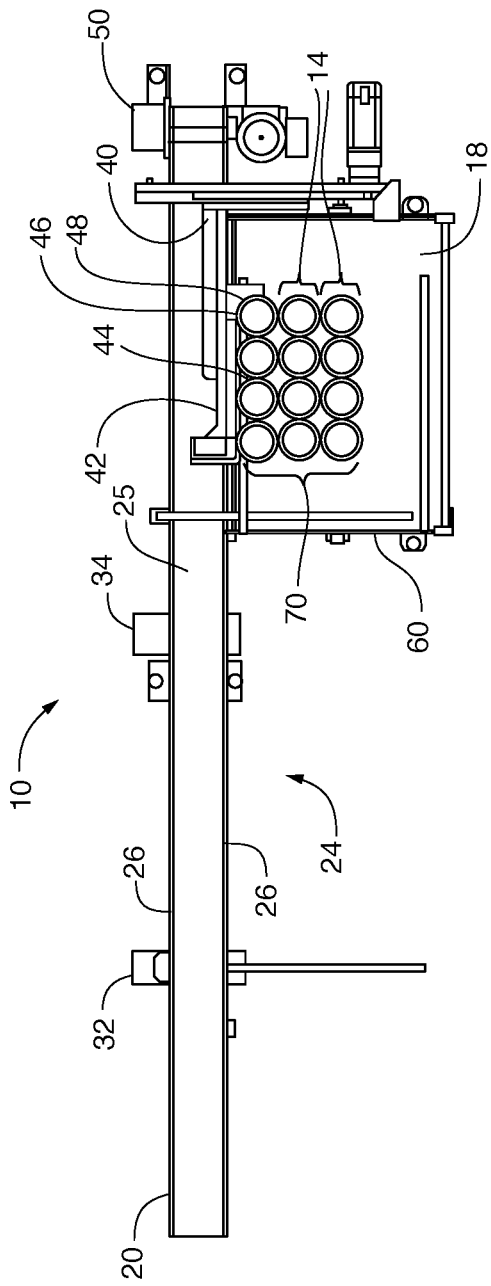
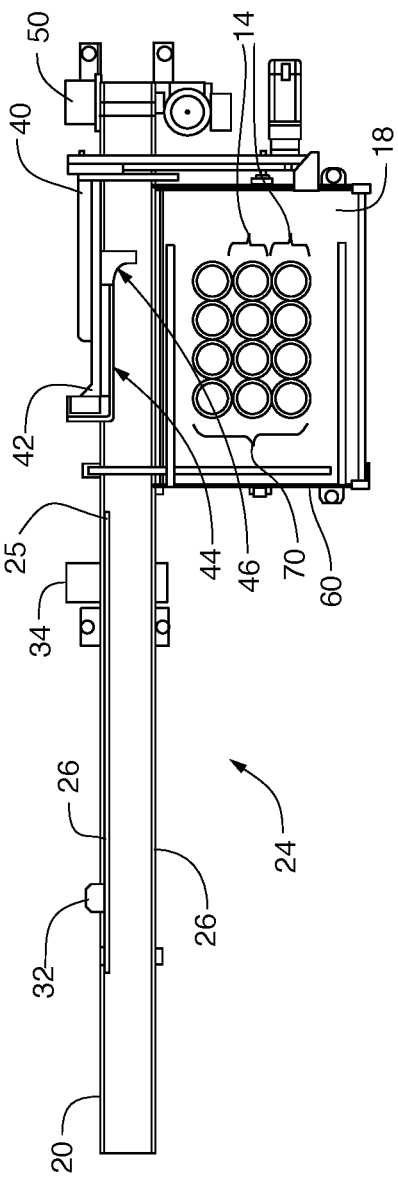

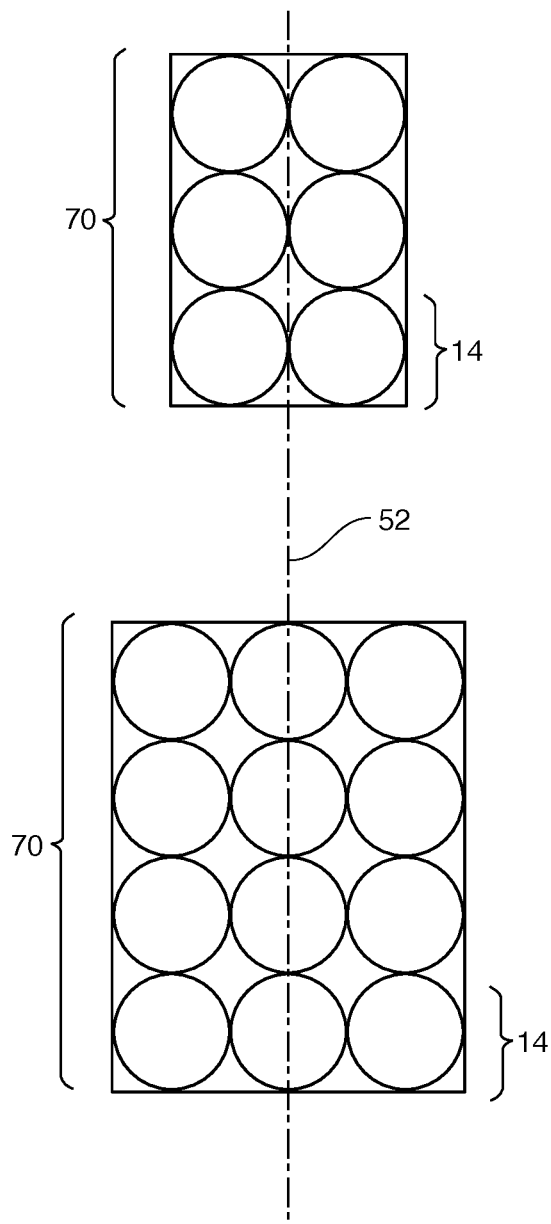

COMPACT COLLATOR, SYSTEM AND METHOD OF USE

FIELD OF THE INVENTION

The present disclosure is directed to a compact collator, a packaging system including the collator, and methods of using same, wherein spaced apart product containers being are collated into groupings or slugs of a desired number and arrangement, and then using a cross-pusher assembly to transport the slugs of containers onto a staging area and into a desired pattern, which may be subsequently transferred or packaged in its entirety.

SUMMARY

Conventional product collating and sorting systems are often configured to handle product containers of a particular size and shape. In addition, such systems are often configured for assembling groups or patterns of product containers having a predetermined number of containers arranged in a particular configuration prior to packaging. Some sorting systems include diverters or laners for collating containers into multiple lanes and then forming groups of such containers from these lanes. An additional collator may then be employed to combined together these groups prior to packaging.

In order to use the same system to assemble containers of different shapes and/or sizes, the diverters may need to be replaced with diverters of different sizes or rearranged in order to create different size groups. Thus, in order to package containers of different sizes and shapes and to create various different configurations of containers, multiple changeover parts may be needed and the secondary packaging system may need to be reconfigured as well. This adds time and cost to the secondary packaging operation.

In addition, the use of multiple laners, diverters and collators to assemble product containers into a desired pattern or arrangement suitable for packaging often results in systems having a relatively large foot print.

It would be desirable to provide a more compact collator apparatus and system that may be used to assemble product containers into an assemblage of containers of any desired number or pattern prior to packaging, and wherein such a collator may be readily converted for use with any type, size or shape of product containers. Embodiments of the collator, and systems including such a collator, described herein fulfill this desire.

BRIEF DESCRIPTION OF THE DRAWINGS

FIG. 2 is a reversed perspective view of the system shown in FIG. 1 with no containers present.

FIG. 3 is a top down perspective of the collator shown in FIG. 1 and illustrates the first step in a sequence of how individual product containers advancing on a laner are formed into slugs of multiple containers.

FIG. 4 is a top down perspective of the collator shown in FIG. 3 and illustrates the next step of the slug forming sequence.

FIG. 5 is a top down perspective of the collator shown in FIG. 4 and depicts the advancement of a formed slug of product containers into the cross-pusher assembly.

FIG. 6 is a top down perspective of the collator shown in FIG. 5 and depicts the receipt of the slug of product containers into the contoured face of the cross-pusher arm.

FIG. 7 is a top down perspective of the collator shown in FIG. 6 and depicts the actuation of the cross-pusher arm and the transfer of the slug onto a staging area.

FIG. 8 is a top down perspective of the collator shown in FIG. 7 and depicts the pattern arrangement of multiple slugs having been deposited onto the staging area and the cross-pusher arm is returned to its original position.

FIG. 9 is a graphical representation of two potential patterns of product containers that may be assembled in accordance with the sequence depicted in FIGS. 3-8.

FIG. 11b is a top down view of the cross-pusher arm and containers shown in FIG. 11a.

DETAILED DESCRIPTION

Figure 1:
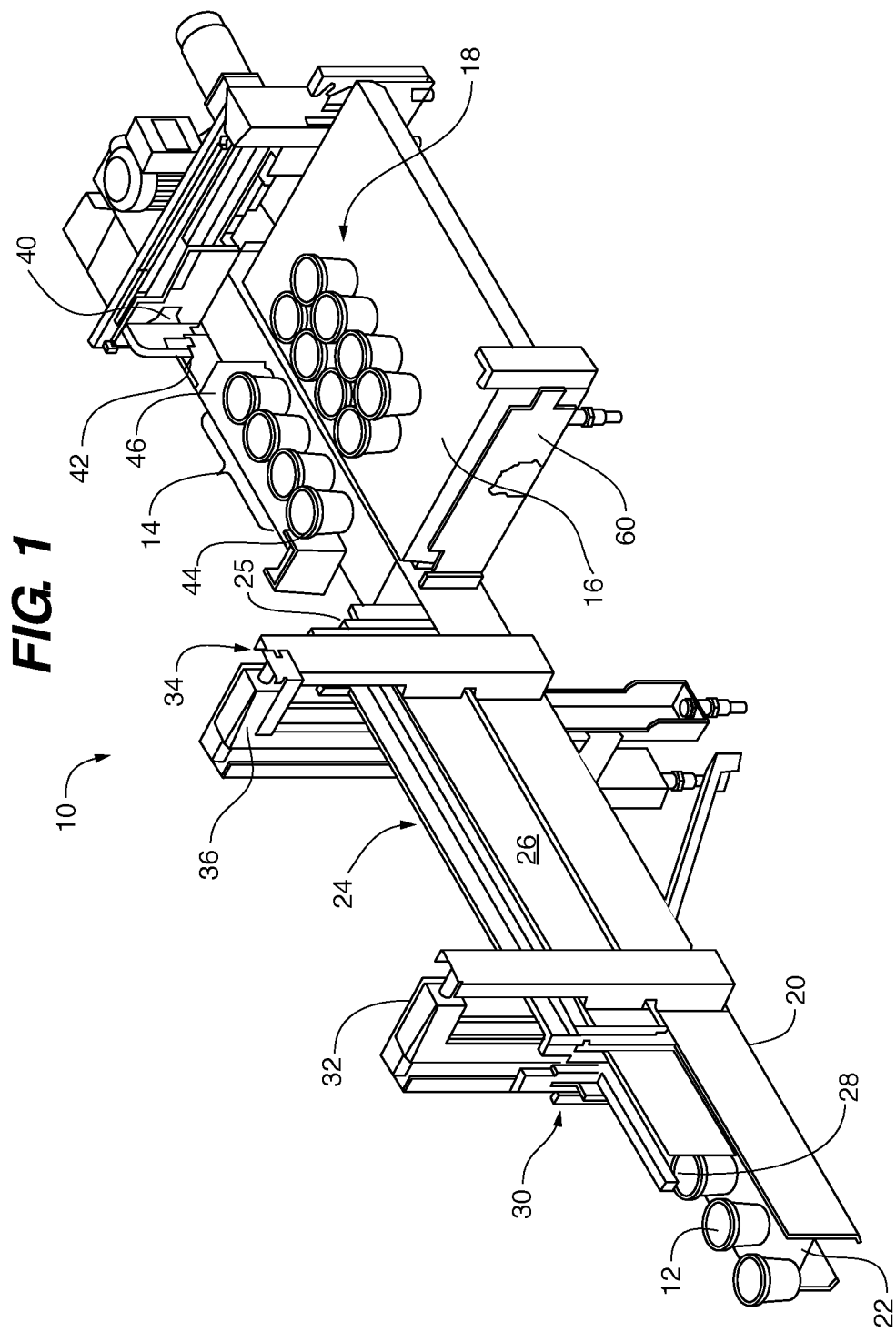
FIG. 1 is a perspective view of an embodiment of collator including product containers shown being advanced, sorted and assembled via a cross-pusher assembly into a desired pattern.

As illustrated in FIG. 1, the general function of the compact collator 10 is to compile some number of spaced apart product containers 12 into groups or slugs 14 of some larger number of containers, and then move each slug 14 onto a staging area 16, and arrange one or more slugs 14 into an arrangement or pattern 18 suitable for eventual packaging or transfer into a packaging container.

The primary components of the compact collator 10 are shown in FIG. 1. A sequence of the operation of collator 10, showing the advancement of the product containers 12, their formation into slugs 14 and their final assembly into a pattern 18 is depicted in FIGS. 3-8.

The collator 10 as shown in FIGS. 1-8, is comprised of a product laner 20, which includes a conveyor 22 for conveying product containers 12 (not shown in FIG. 2) from a source of such containers such as another conveyor, etc. (not shown) to an infeed area 24 having a product gate 25. The conveyor 22 runs at a speed that is specific to the product containers dimensions, and may be a fixed speed or run at a variable speed. The speed of the conveyor 22 may be setup to impose a gap between product containers 12 as they are advanced from the product source. A gap is necessary between the product containers 12 when they are first coming onto the infeed area 24. When the product containers 12 stop via the closed gate 25, the gaps between the product containers 12 are eliminated but only for the number of product containers in the grouping assembled in the infeed area (slug 14). The product containers 12 that are still entering the infeed area 24 will have gaps between them so as to allow the machine to run continuously even as the slugs 14 are assembled.

The infeed area 24 comprises side walls 26 which contain the incoming product containers 12. The side walls 26 include infeed guides 28 on their interior surfaces (visible in FIG. 2) which are adjustable to accommodate changes in the width and/or height of the incoming product containers 12. The infeed guides 28 prevent containers 12 from tipping or shifting while moving through the infeed area 24, such as in the manner shown in FIG. 3.

Near the entrance 30 to the infeed area 24, is positioned a first infeed sensor 32. This sensor detects the passage of each product container 12 passing into the infeed area 24. The first infeed sensor 32 counts the number of product containers 12 passing into the infeed area 24 and tracks the position of each container 12 on the conveyor 22.

At the exit 34 of the infeed area 24 is positioned a gate 25 which prevents the passage of product containers 12 within the infeed area 24 until a predetermined number and arrangement of product containers 12 is present in the infeed area 24 as determined by the detection of the desired number of product containers 12 by the first infeed sensor 32. This predetermined number of product containers may be any number of containers, ranging from two to anynumber, with the upper limit of containers 12 being limited by their size and weight being suitable for collective packaging. This number of product containers 12 that must be present before the gate 25 is opened is referred to hereinafter as a "slug" 14. In the embodiment shown in FIGS. 1 and 3-8 a slug 14 consists of four product containers.

If the desired number of product containers 12, necessary to make a full slug 14 is not counted by the first infeed sensor 32, the gate 25 will remain closed and product containers 12 will not be allowed through the exit 34 of the infeed area 24, such as in the manner illustrated in FIG. 3. When the proper number of containers 12 sufficient to make a slug 14 is counted by the first infeed sensor 32, then the gate 25 will open to allow the entire slug 14 to pass through the exit 34 of the infeed area 24 and be conveyed to and received by the cross-pusher assembly 40 in the manner shown in FIGS. 4-6.

The gate 25 will remain open to allow the entire slug 14 to be moved along the conveyor 22 and into the vicinity of the cross-pusher assembly 40. As the requisite number of product containers 12 pass through the exit 34 of the infeed area 24, a second infeed sensor 36 detects each product container's passage and position on the conveyor 22. An encoder 50 (not visible in FIG. 1) in communication with the conveyor 22 and the infeed sensors 34 and 36 measures and verifies the position of each product container 12 that make up the slug 14 and tracks each container's position as it is advanced.

As is illustrated in FIG. 6, when a last product container 13 of the slug 14 passes the second infeed sensor 36, the gate 25 is closed, and the next grouping of product containers will begin forming a new slug behind the now closed gate 25, while the formed slug 14 advances to the cross-pusher assembly 40.

In the event that too many or too few product containers 12 pass through the gate 25, the system will alarm. When this occurs, the line will shut down (conveyors 22 and 60 will cease moving, cross-pusher assembly will not actuate, etc.) because a fault condition has occurred. The source of the alarm, in this case, is the second infeed sensor 36, which detects (i.e. counts) the number of product containers 12 passing the sensor. This count is checked against the anticipated number of products that are expected to comprise a slug 14. When there is a mismatch the system 10 will shut down because there are too few or too many product containers 12 in the slug 14.

As the containers 12, which make up the slug 14, pass the gate 25, the conveyor 22 advances the containers 12 along and into the arm 42 of the cross-pusher assembly 40. The cross-pusher assembly 40 comprises an arm 42 which is positioned adjacent to the conveyor 22 and extends substantially parallel thereto. The arm 42 has a contoured surface or face 44 which is custom shaped to correspond to, and form a complementary interface with, the shape of the product containers 12 such as in the manner shown in FIGS. 11-16 and discussed in greater detail below. The arm face 44 receives and retains the containers 12 of the slug 14 as they are advanced by the conveyor 22. The face 44 of the arm 42 is contoured such that the containers 12 are advanced along the length of the arm 42 until the first container 11 of the slug 14 comes into contact with a stop surface 46 formed at the "elbow" 48 of the arm 42 in the manner depicted in FIGS. 5 and 6. The remaining containers 12 of the slug 14 then collect against the first product container 11 as the conveyor pushes the remaining containers forward toward the stop surface 46. This forces the containers 12 that make up the slug to assemble into a line that the custom contoured face 44 of the arm ensures is consistently formed.

Once the entire slug 14 of containers 12 is positioned against the face 44 of the arm 42, such as in the manner shown in FIG. 6, the cross-pusher assembly 40 is activated and the cross-pusher arm 42 moves the slug 14 90 degrees across the path of the conveyor 22, pushing the slug 14 onto the staging area 16 of a pattern conveyor 60 such as in the manner show in in FIGS. 7 and 8. The ability of the collator 10 to move product containers 12 from the laner's conveyor 22 to a staging area of another conveyor 60 or other apparatus in a perpendicular manner allows the collator 10 to have a significantly reduced foot print relative to existing collators.

The collator 10 may be configured to assemble any number of slugs 14 onto the staging area 16 in accordance with a predetermined pattern or arrangement of multiple slugs that when assembled in the desired manner, form a pre-packaging assembly 18 of product containers 12 that is then conveyed by the pattern conveyor 60 to a down-stream packaging caser, wrapper or other device where the pre-packaging assembly 18 is packaged for shipping.

As is illustrated in the embodiment shown in FIGS. 7 and 8, the pre-packaging assembly 18 in the example presented consists of three slugs 14 of four product container's each. The cross-pusher arm 42 and the pattern conveyor 60 move in concert with one another such that the speed of the product slug 14 moving onto the staging area 16 of the product conveyor 60 are the same. As each slug 14 is transferred from the lane conveyor 22 to the staging area 16 of the pattern conveyor 60, the pattern conveyor 60 advances in unison with the movement of the cross-pusher arm 42 thereby ensuring that each subsequent slug 14 progresses forward and is moved into position within the developing pattern of the evolving assembly 18, without pushing against or otherwise destabilizing slugs 14 or product containers 12 already placed on the staging area 16. As a result, slugs 14 remains stable and centered relative to each other and individual product containers 12 maintain proper spacing.

Figure 17:
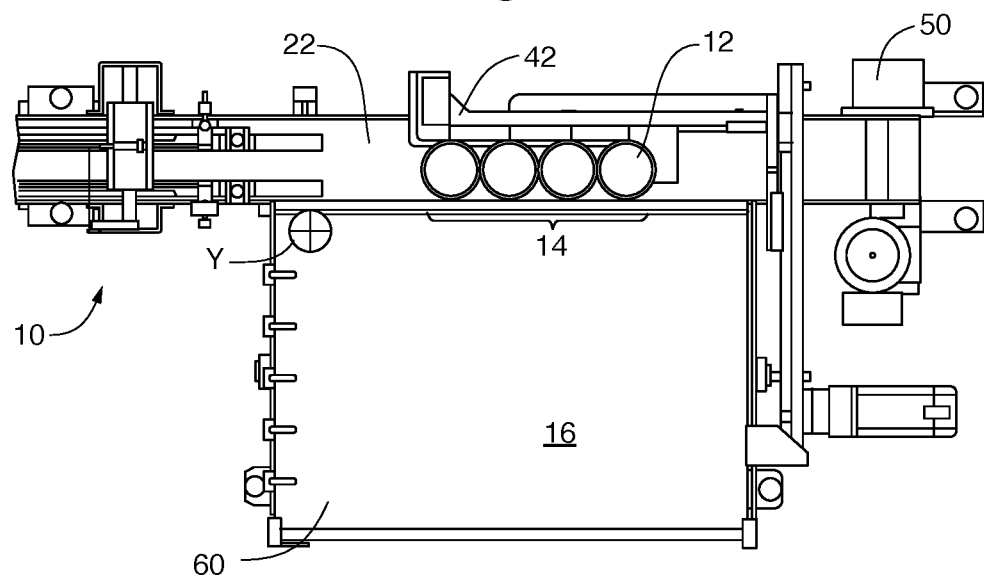
FIGS. 17-21 is a sequence of images showing a partial view of the collator depicted in FIG. 1, wherein assembly of a pre-packaging pattern of product containers is depicted via the transfer of successive slugs of product containers from the lane conveyor to the staging area of the pattern conveyor via actuation of the cross-pusher arm and coordinated advancement of the pattern conveyor.
Figure 18:
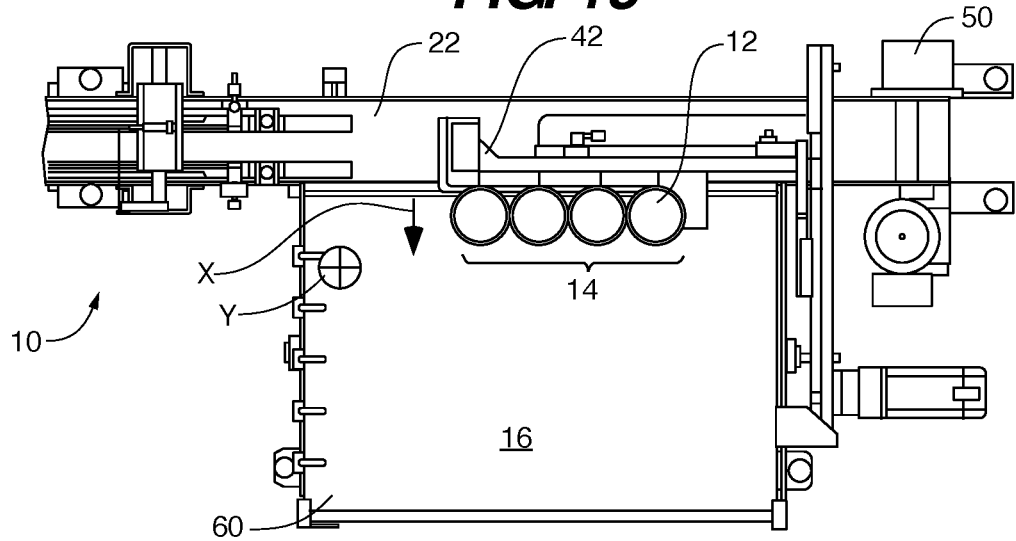

The advancement of the pattern conveyor 60 in unison with the actuation of the cross-pusher arm 42 may best be illustrated by the representative sequences, shown in FIGS. 17-21 and FIGS. 22-25 respectively. Here, it is shown that for each actuation or advancement of the cross-pusher arm 42 from its nominal position (where it has received a slug 14 of product containers 12 along and above the lane conveyor 22 such as is shown in FIG. 17) to its actuated position (where it has crossed over the lane conveyor 22 and pushed the slug 14 of product containers 12 onto the pattern conveyor 60 such as is shown in FIG. 18), the cross-pusher arm moves a distance X, as represented by the arrow labled X on FIG. 18 (i.e. the length of the cross-pusher arm's stroke). Simultaneously and in unison with the actuation of the cross-pusher arm 42, the pattern conveyor advances the same distance as that of distance X. This advancement may be seen by comparing a given location (marked by crosshairs Y) on the pattern conveyor 60 which is advanced the same distance as that of the cross-pusher arm 42 during actuation.

Figure 19:
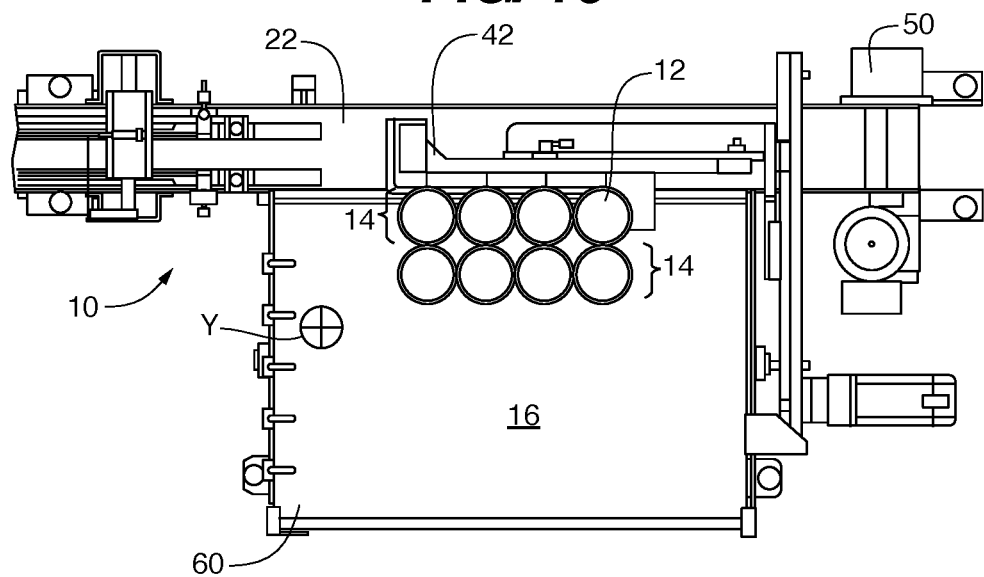
Figure 20:
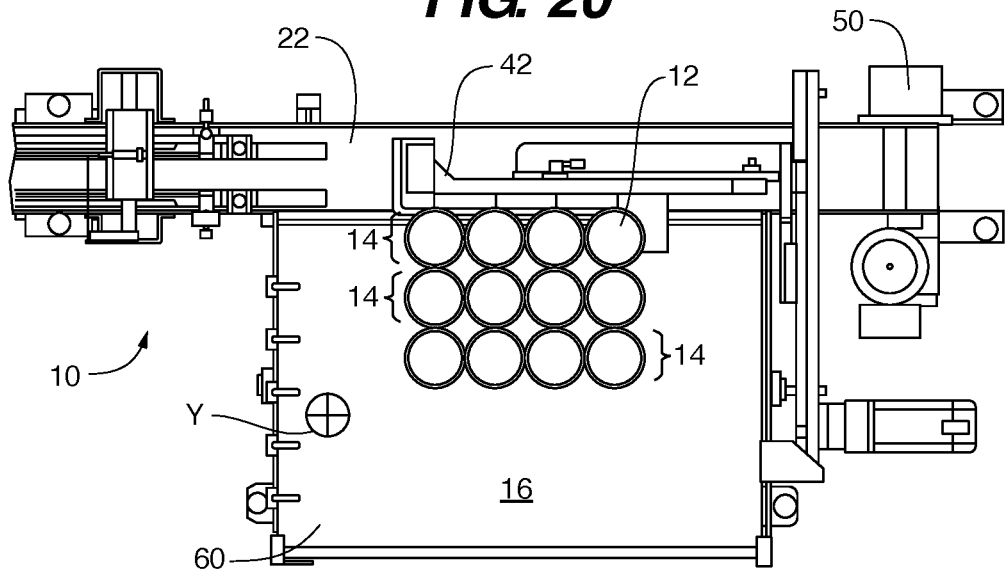
Figure 21:
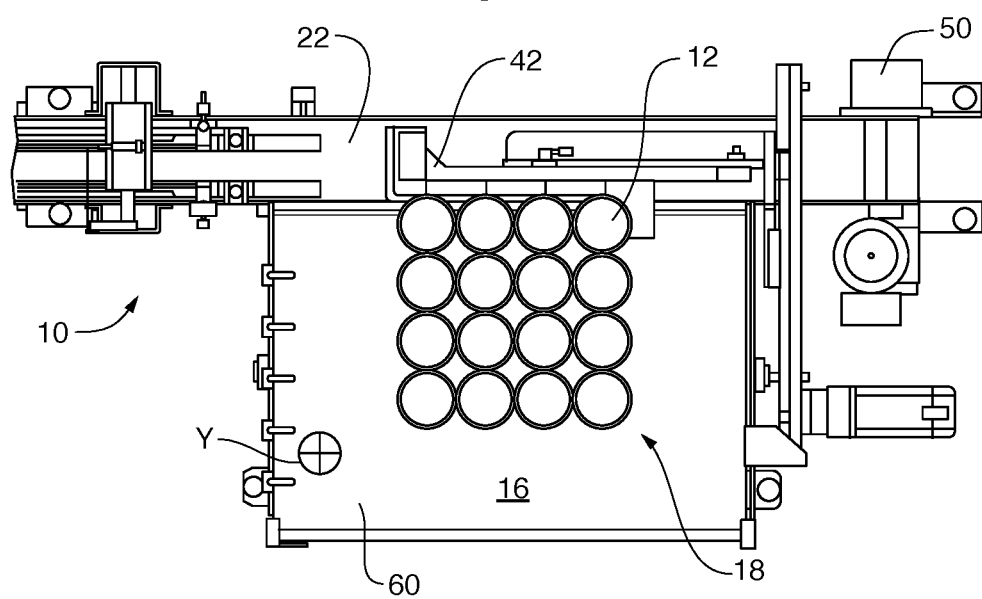
Figure 22:
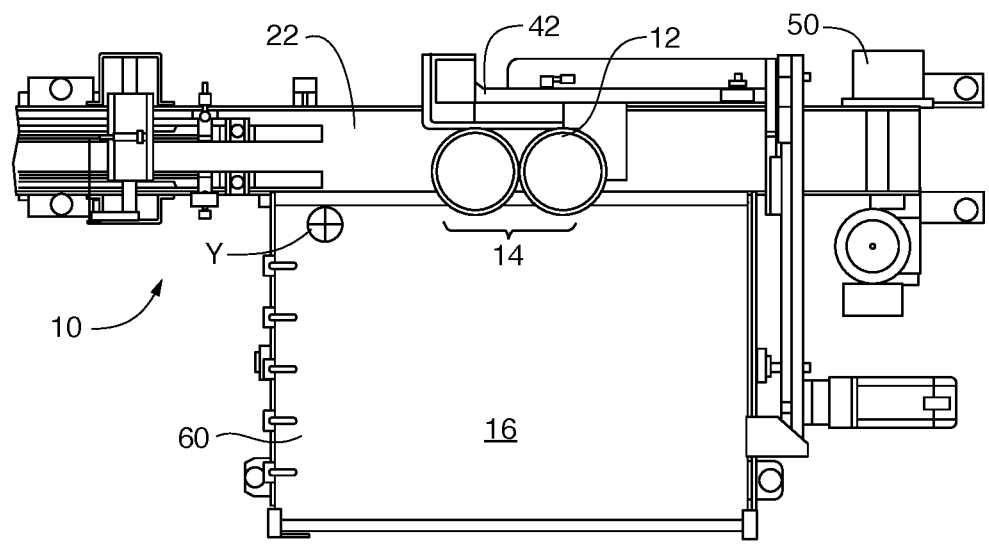
FIGS. 22-25 shows a similar sequence as that depicted in FIGS. 17-20 but wherein the pre-packaging pattern comprises fewer slugs and fewer product containers, and wherein the product containers have a larger size.
Figure 23:
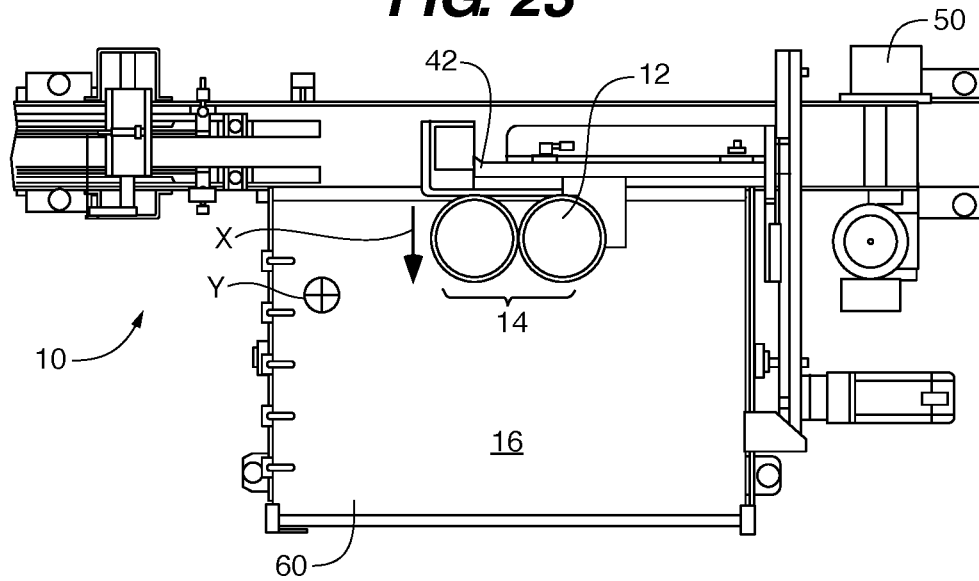
Figure 24:
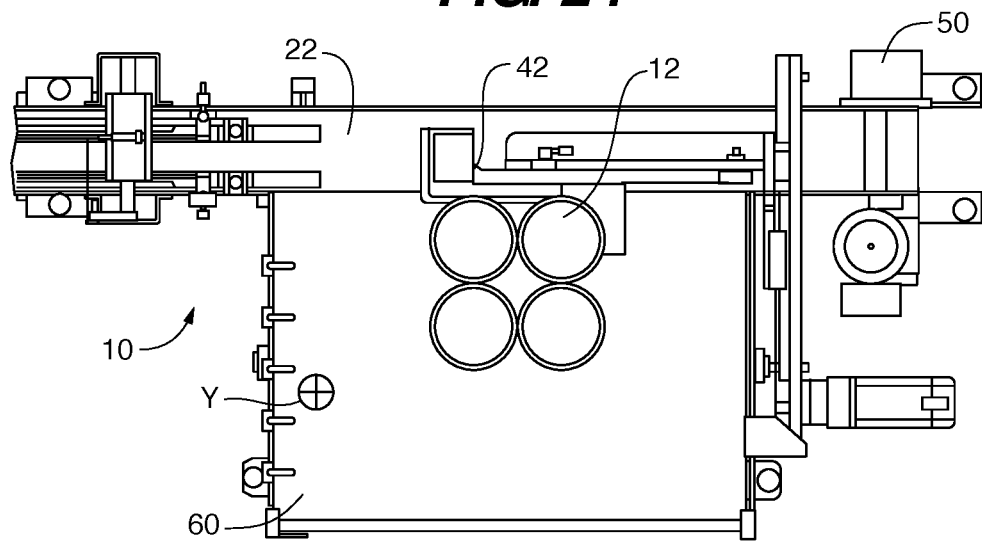
Figure 25:
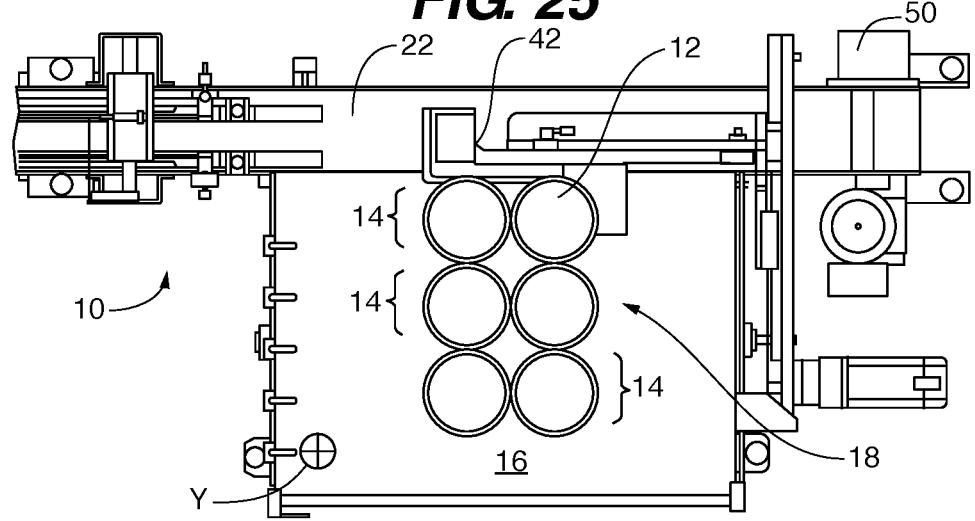

These corresponding movements of the cross-pusher arm 42 and pattern conveyor 60 will be repeated as each slug 14 is transferred onto the staging area 16 to form the final shipping or pre-packaging assembly 18 in the manner shown in FIGS. 19-21. When the pre-packaging assembly 18 is fully formed, such as is illustrated in FIG. 21, the assembly 18 is conveyed or otherwise transferred off of the staging area 16.

Depending on the size of the product containers 12 the distance X traveled by the cross-pusher arm 42 and pattern conveyor 60 will change.

Generally speaking, the larger the diameter or base size of the product container the larger distance X will be. For example, in the embodiment shown in FIGS. 22-25, the product containers 12 making up each slug 14 are much larger in diameter than those depicted in FIGS. 17-21. As a result of the larger size of the product containers 12, the distance X that the product containers must travel in order to be transferred from the lane converyor 22 to the staging area 16 of the pattern conveyor 60 is larger than in the embodiment shown in FIGS. 17-21.

Figure 10:
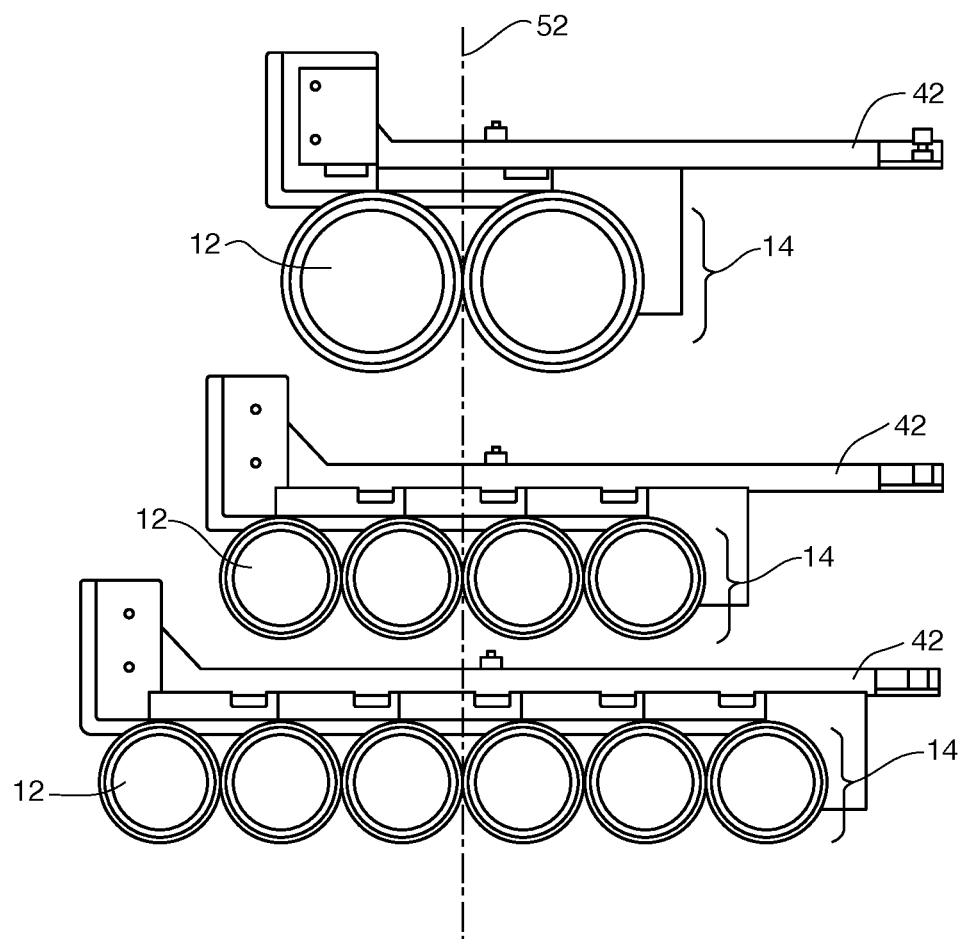
FIG. 10 is a close-up view of example slug configurations of product containers having different sizes and numbers, but wherein regardless, the product containers are always centered along the cross-pusher arm.

As indicated above, the arm 42 is customizable and depending on the size and shape of the product containers 12, and is provided with a length that ensures that a slug 14 of product containers is arranged around a centerline 52 about which equal portions of the length of the slug 14 is divided on either side of the centerline 52 in the manner shown in FIGS. 9 and 10. By maintaining a consistent position of each slug 14 relative to the centerline 52, multiple slugs 14 may be arranged in the staging area 16 with precision and consistency when the cross-pusher assembly 40 advances them to form the pre-package assembly 18.

The customizable nature of the cross-pusher arm 42, and more particularly, the face 44 of the arm 42 is illustrated in the various embodiments shown in FIGS. 11-16. The face 44 is defined by an insert 45 that may be constructed on a custom basis to match the contour of any type of product container 12 that the collator 10 is to configured to collate and assemble into pre-package assemblies in the manner described above. When a specific product container geometry is known, the face insert 45 may then be custom manufactured via 3-D printing or other technique and then attached to the arm 42 by mechanical interface or other mechanism.

When properly attached to the arm 42 in the manner shown in FIGS. 11-16, the insert 45 provides a face 44 having a contour that matches that of the product container 12 to ensure that when the cross-pusher arm 42 sweeps the slug 14 of product containers 12 off the laner conveyor 22 and onto the staging area 16, the integrity of the slug 14, as well as the upright stability and spacing of each product container 12 is maintained throughout the cross-pushing transfer.

FIGS. 11-16 provide illustrative examples of some of the different types of matching contours that the customizable insert 45 may provide between the insert face 44 and a given shape 15 of product container 12. As the illustrations make clear, the insert face 44 may be tailored with great precision so as to closely match the shape of the product container 12 so as to maintain the containers stability during movement.

Figure 11A:
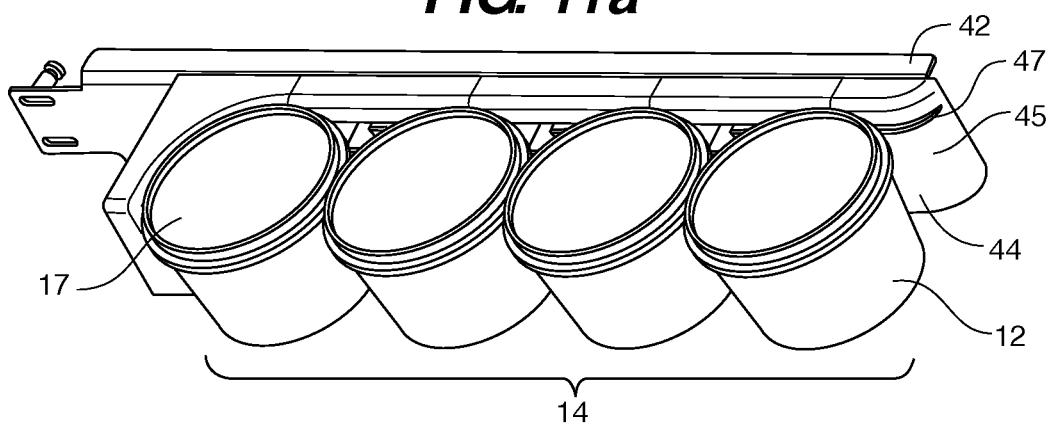
FIG. 11a is a perspective view of an embodiment of a cross-pusher arm configured for use with product container of a particular number and profile.
Figure 11B:
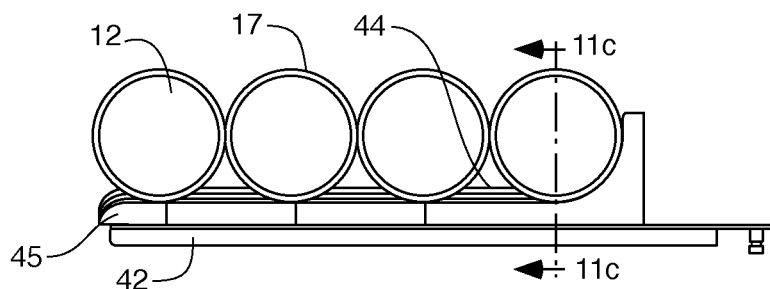
Figure 11C:
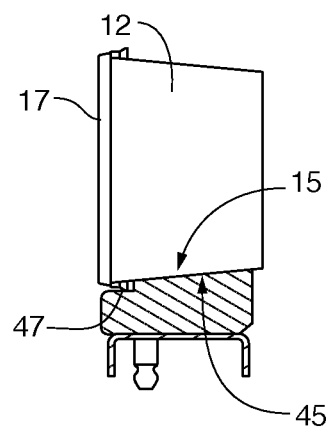
FIG. 11c is a sectional view of the cross-pusher arm and a container shown in FIG. 11b and illustrating the correspondence in profile between the face of the cross-pusher arm and the shape of the product container.

Starting with the embodiment shown in FIGS. 11a, 11b and 11c; here a product container 12 has a widening frustoconical side profile or shape 15. The insert 45 as may best be seen in FIG. 11c, has a face 44 that corresponds to the shape of the container 12, including a notched region 47 to accommodate the greater relative width of the container lid 17.

Figure 12A:
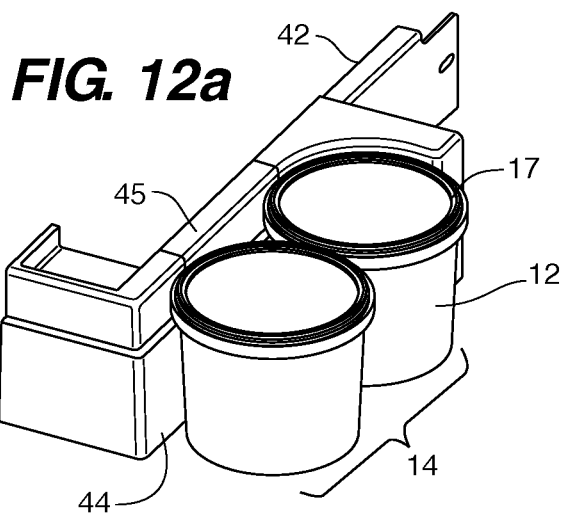
FIG. 12a is a perspective view of an embodiment of a cross-pusher arm configured for use with product container of a particular number and profile.
Figure 12B:
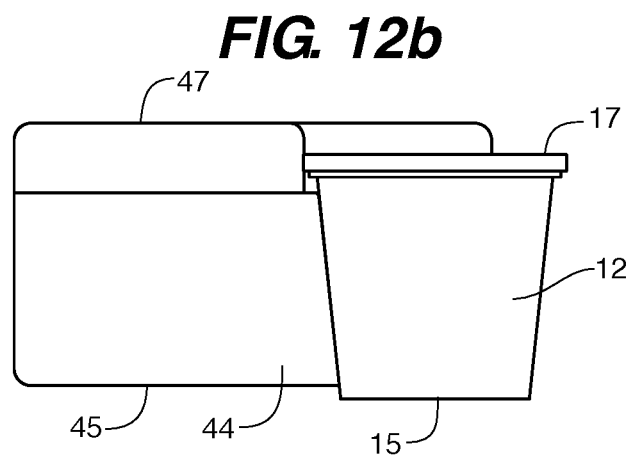
FIG. 12b is a sectional view of the cross-pusher arm and a container shown in FIG. 12a and illustrating the correspondence in profile between the face of the cross-pusher arm and the shape of the product container.
Figure 12C:
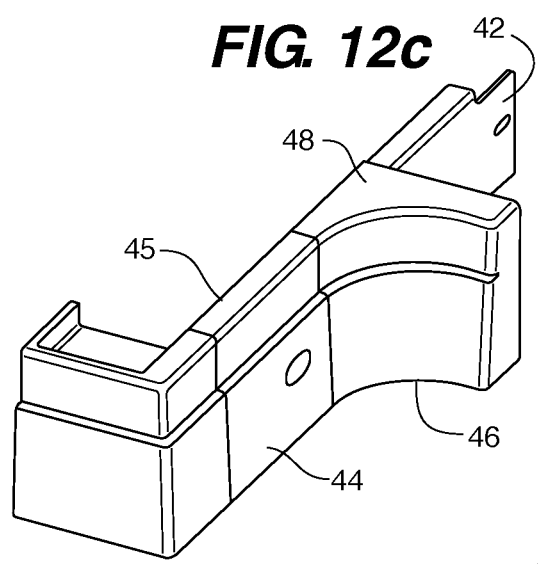
FIG. 12c is a perspective view of the embodiment of a cross-pusher arm shown in FIG. 12a with the product containers absent so as to better show the face of the cross-pusher arm.
Figure 12D:
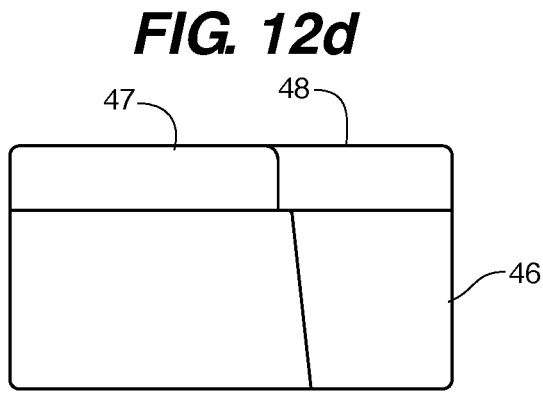
FIG. 12d is a sectional view of the cross-pusher arm shown in FIG. 12c.
Figure 13A:
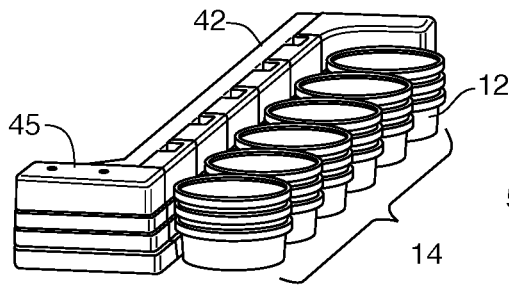
FIG. 13a is a perspective view of an embodiment of a cross-pusher arm configured for use with product container of a particular number and profile.
Figure 13C:
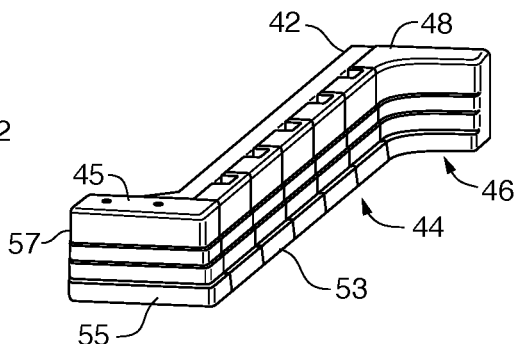
FIG. 13c is a perspective view of the embodiment of a cross-pusher arm shown in FIG. 13a with the product containers absent so as to better show the face of the cross-pusher arm.
Figure 13B:
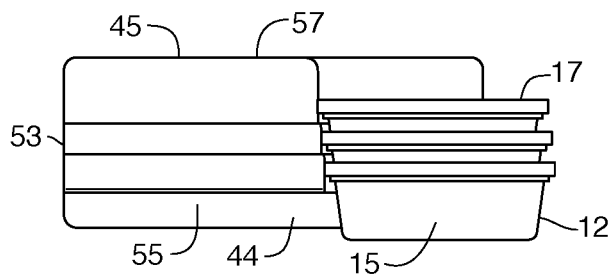
FIG. 13b is a sectional view of the cross-pusher arm and a container shown in FIG. 13a and illustrating the correspondence in profile between the face of the cross-pusher arm and the shape of the product container.
Figure 13D:
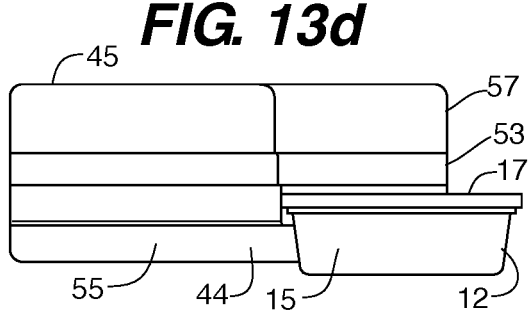
FIG. 13d is the same sectional view of the cross-pusher arm shown in FIG. 13b bnut with an alternative type of product container shown, to illustrate that the face of the cross-pusher arm may be suitable for use with different sizes and shapes of containers.
Figure 14A:
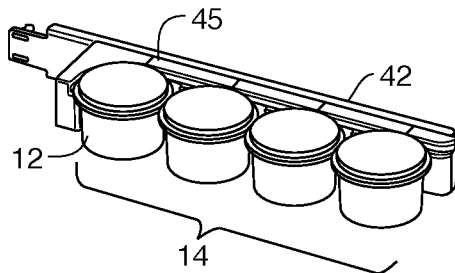
FIG. 14a is a perspective view of an embodiment of a cross-pusher arm configured for use with product container of a particular number and profile.
Figure 14C:
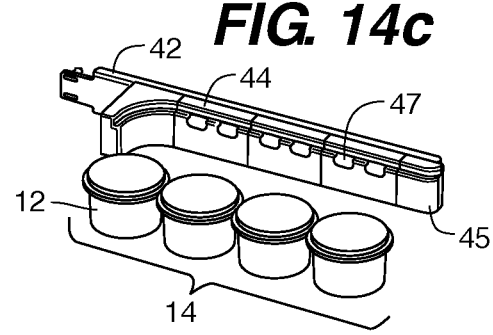
FIG. 14c is a perspective view of the embodiment of a cross-pusher arm shown in FIG. 14a with the product containers shown spaced apart from the cross-pusher arm so as to better show the face of the cross-pusher arm.
Figure 14B:
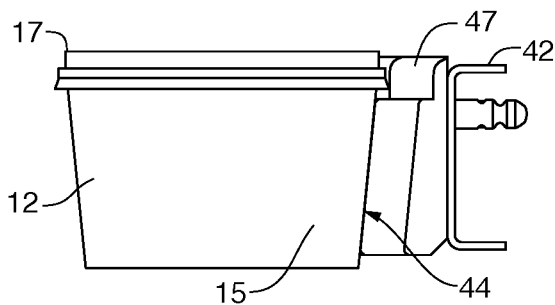
FIG. 14b is a sectional view of the cross-pusher arm and a container shown in FIG. 14a and illustrating the correspondence in profile between the face of the cross-pusher arm and the shape of the product container.
Figure 14D:
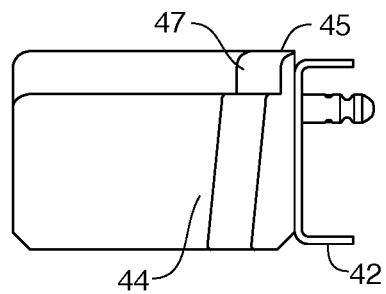
FIG. 14*d* is a sectional view of the cross-pusher arm shown in FIG. 14*c*.
Figure 15A:
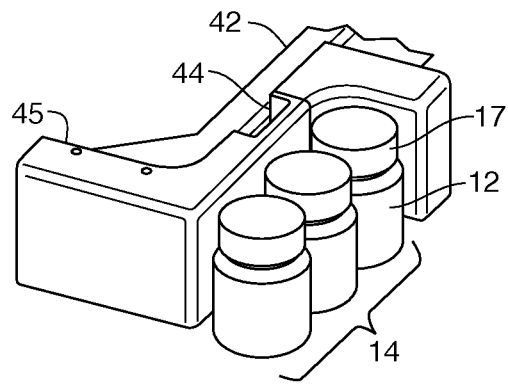
FIG. 15*a* is a perspective view of an embodiment of a cross-pusher arm configured for use with product container of a particular number and profile.
Figure 15C:
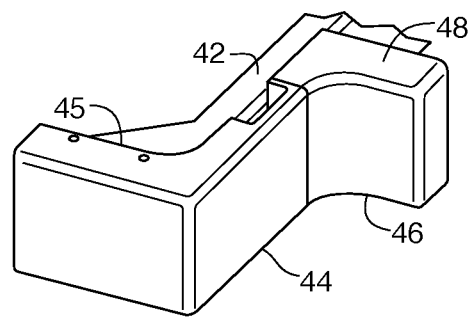
FIG. 15*c* is a perspective view of the embodiment of a cross-pusher arm shown in FIG. 15*a* with the product containers absent so as to better show the face of the cross-pusher arm.
Figure 15B:
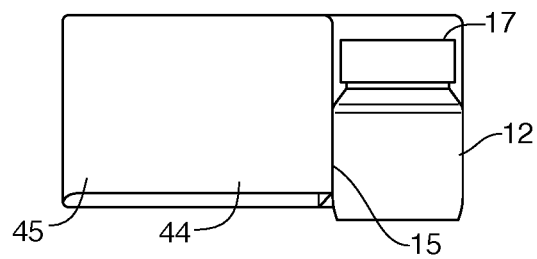
FIG. 15*b* is a sectional view of the cross-pusher arm and a container shown in FIG. 15*a* and illustrating the correspondence in profile between the face of the cross-pusher arm and the shape of the product container.
Figure 15D:
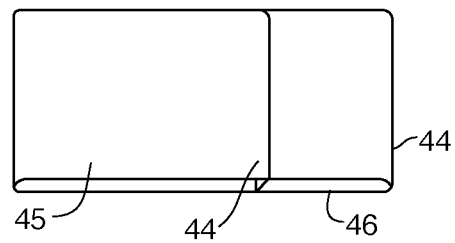
FIG. 15*d* is a sectional view of the cross-pusher arm shown in FIG. 15*c*.
Figure 16A:
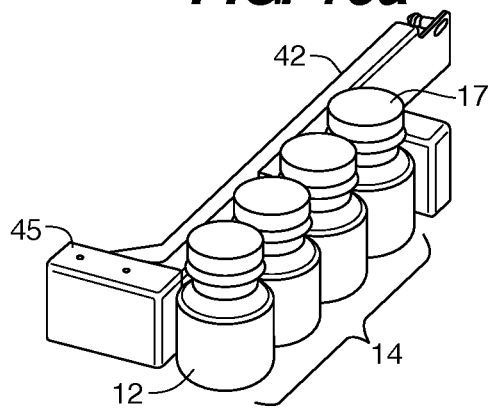
FIG. 16*a* is a perspective view of an embodiment of a cross-pusher arm configured for use with product container of a particular number and profile.
Figure 16C:
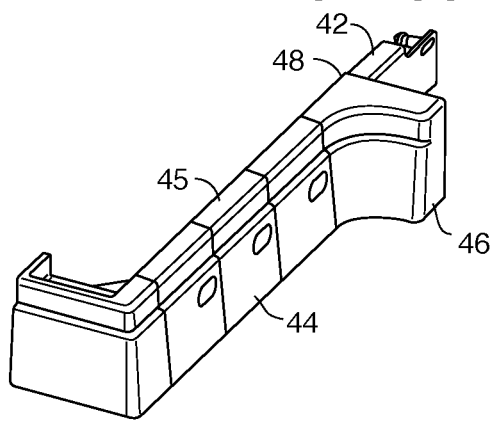
FIG. 16*c* is a perspective view of the embodiment of a cross-pusher arm shown in FIG. 16*a* with the product containers absent so as to better show the face of the cross-pusher arm.
Figure 16B:
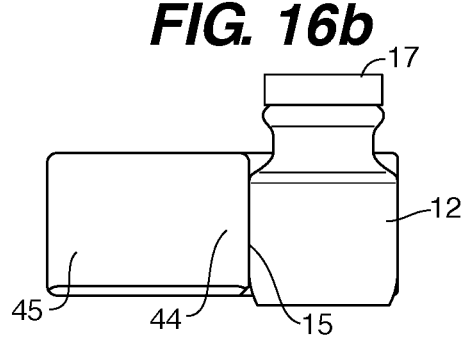
FIG. 16*b* is a sectional view of the cross-pusher arm and a container shown in FIG. 16*a* and illustrating the correspondence in profile between the face of the cross-pusher arm and the shape of the product container.
Figure 16D:
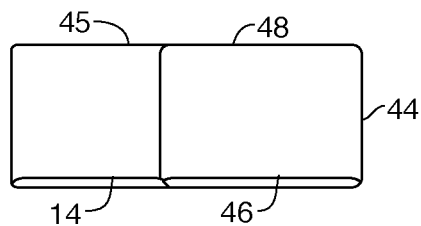
FIG. 16*d* is a sectional view of the cross-pusher arm shown in FIG. 16*c*.

A similar configuration is shown in the embodiment of FIGS. 12a-12d, but which includes an arm 42 configured to receive a slug 14 consisting of only 2 product containers. As FIGS. 12c and 12d illustrate, the face 44 of the insert 45 maintains its unique contour along the entire length of the insert and arm, even extending into the stop surface 46 of the elbow 48. This correspondence of profile and shape ensures that the force applied to each product container 12 by the arm 42 is consistently applied regardless of where the product container 12 is in contact with the insert face 44.

In FIGS. 13a-13d an embodiment of the insert 45 is shown wherein the length of the insert 45 is configured to accommodate a slug 14 consisting of five product containers 12. The insert 45 is also provided with a face 44 having staggered or stepped portions 53 that are wider at the bottom 55 of the insert 45 and recede progressively in width, with each stepped portion 53 being narrower than the one beneath as they approach the top of the insert 57. The bottom portion 55 of the face 44 has a shape which matches the frustoconical shape 15 of a product container 12. The width of each stepped portion 53 may be selected to correspond to the witdth of a lid 17 of the product container of varying diameters, depending on the height of the product container 12. As a result of this unique stepped configuration, a single insert 45 may be used to collate product containers having a variety of heights and lid diameters.

Turning to FIGS. 14a-14d, an embodiment of the insert is shown, which is configured to accommodate a slug 14 of four relatively large product containers 12, again where the insert 45 has a face 44 that corresponds to the shape of the container 12, including a notched region 47 to accommodate the greater relative width of the container lid 17.

In the embodiments shown in FIGS. 15a-15d, and 16a-16d respectively, the insert 45 provides a face 44 which is substantially vertical so as to provide a contact surface for product containers 12 having a cylindrical shape 15 or at least one that is predominantly cylindrical or otherwise corresponds to a vertical profile where the product container 12 contacts the insert face 44. For example, in the embodiment shown in FIG. 15a-15d the product container 12 has a shape 15 that is predominantly cylindrical, but with a narrower taper where the lid 17 is placed. Because the product container 12 in this case has a sufficiently low center of gravity it is not essential to contact the entire or even the majority of the product containers shape (tangentially or otherwise). If desired, the face 44 could of course be provided with a bump or outcropping so as to better contact the lid 17, but given the nature of the product container 12 is not necessary in this case. Similarly, in the embodiment shown in FIGS. 16a-16b, the product containers 12 have a height that extends beyond the height of the insert 45. Nevertheless, the face 44 of the insert 45 is again configured to be substantially vertical so as to come into contact with only the cylindrical shape 15 of the product container's base portion.

The example configurations of insert 45 are illustrative only and are not intended to be exhaustive. Various other configurations may be provides so as to allow the collator 10 to accommodate any size or shape of product container, to form slugs of product containers of any number suitable for forming a pre-package assembly.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A compact collator comprises:
a laner, the laner having a first movable conveyor for conveying product containers through the laner, the laner defining an infeed area,
the infeed area comprising a first infeed sensor positioned at an entrance to the infeed area, the first infeed sensor constructed and arranged to detect individual product containers being conveyed through the entrance, a second infeed sensor positioned at an exit to the infeed area, and a gate positioned adjacent to the exit, the gate having a default closed position and is actuatable to an open position, in the closed position the gate prevents product containers from being conveyed out of the infeed area, the gate being actuated from the closed position to the open position only when the first infeed sensor detects a predetermined number of product containers having passed through the entrance;
a pattern conveyor, the pattern conveyor having a second movable conveyor positioned down-stream from the infeed area and off-set 90 degrees from the first moveable conveyor; and
a cross-pusher assembly, the cross-pusher assembly positioned downstream of the infeed area, the cross-pusher assembly having a cross-pusher arm, the cross-pusher arm being actuatable between a first position and a second position, the first position and the second position defining a stroke distance therebetween,
the cross-pusher arm comprises a first portion that extends parallel to the first moveable conveyor, and an elbow portion that extends in a curve from the first portion, the cross-pusher arm also comprising an insert, the insert defining a face, in the first position the face being configured to contact each of the predetermined number of product containers advanced through the gate, a portion of the face extends over the elbow and further defines a stop surface, the stop surface positioned to receive a first of the predetermined number of product containers and prevents the predetermined number of product containers from being conveyed further by movement of the first moveable conveyor;
in the first position, the cross-pusher arm is positioned adjacent to a first side of the first moveable conveyor, in the second portion, the cross-pusher arm is positioned on a second side of the first moveable conveyor opposite the first side and the cross-pusher arm is also positioned over a staging area of the pattern conveyor;

when the cross-pusher arm is actuated from the first position to the second position, the pattern conveyor advances the same distance as the stroke distance.

2. The compact collator of claim 1, wherein each of the predetermined number of product containers has a common frustoconical side profile with one another, the face defining a contour, the contour corresponds to the profile.

3. The compact collator of claim 2, the second infeed sensor constructed and arranged to detect each product container of the predetermined number of product containers being conveyed through the exit of the infeed area, the cross-pusher arm being actuated from the first position to the second position only after the second infeed sensor as detected each of the product container of the predetermined number of product containers.

4. The compact collator of claim 3, wherein the face defines a centerline, the insert configured such that the predetermined number of product containers is equally distributed on either side of the centerline.

5. The compact collator of claim 4, wherein the pattern conveyor receives the predetermined number of product containers from the actuation of the cross-pusher arm from the first position to the second position.

6. The compact collator of claim 5 wherein the predetermined number of product containers received by the pattern conveyor are deposited thereon according to a predetermined pattern.

7. The compact collator of claim 2, wherein the face has a top and a bottom, the top having a top width and the bottom having a bottom width, the bottom width being greater than the top width.

8. The compact collator of claim 7, wherein the face comprises, a plurality of adjacent stepped portions, each of the plurality of adjacent stepped portions having a width, a first of the plurality of adjacent stepped portions being positioned at the bottom of the face and having a width greater than that of any other of the plurality of adjacent stepped portions.

9. The compact collator of claim 8, wherein each of the plurality of adjacent stepped portions has a width which decreases from the bottom of the face to the top of the face.

* * * * *